US011301716B2

(12) United States Patent
Sharma et al.

(10) Patent No.: US 11,301,716 B2
(45) Date of Patent: *Apr. 12, 2022

(54) UNSUPERVISED DOMAIN ADAPTATION FOR VIDEO CLASSIFICATION

(71) Applicant: NEC Laboratories America, Inc., Princeton, NJ (US)

(72) Inventors: Gaurav Sharma, Newark, CA (US); Manmohan Chandraker, Santa Clara, CA (US); Jinwoo Choi, Blacksburg, VA (US)

(73) Assignee: NEC Corporation

( * ) Notice: Subject to any disclaimer, the term of this patent is extended or adjusted under 35 U.S.C. 154(b) by 151 days.

This patent is subject to a terminal disclaimer.

(21) Appl. No.: 16/515,593

(22) Filed: Jul. 18, 2019

(65) Prior Publication Data
US 2020/0065617 A1 Feb. 27, 2020

Related U.S. Application Data

(60) Provisional application No. 62/722,249, filed on Aug. 24, 2018.

(51) Int. Cl.
*G06T 7/20* (2017.01)
*G06K 9/00* (2006.01)
*G06K 9/62* (2022.01)
(Continued)

(52) U.S. Cl.
CPC ....... *G06K 9/6232* (2013.01); *G06K 9/00744* (2013.01); *G06K 9/00765* (2013.01);
(Continued)

(58) Field of Classification Search
CPC .......... G06K 9/00261; G06K 9/00744; G06K 9/00765; G06K 9/00771; G06K 9/03;
(Continued)

(56) References Cited

U.S. PATENT DOCUMENTS

2018/0268265 A1* 9/2018 Sohn ................. G08B 13/19613
2020/0065975 A1* 2/2020 Sharma .................. G06K 9/627

OTHER PUBLICATIONS

Kodirov, Elyor, et al. "Unsupervised domain adaptation for zero-shot learning." Proceedings of the IEEE international conference on computer vision. 2015. (Year: 2015).*
Qiu, Qiang, et al. "Domain adaptive dictionary learning." European Conference on Computer Vision. Springer, Berlin, Heidelberg, 2012. (Year: 2012).*
Zhang, Weichen, et al. "Collaborative and adversarial network for unsupervised domain adaptation." Proceedings of the IEEE conference on computer vision and pattern recognition. 2018. (Year: 2018).*
Li-Ping (Li-Ping, Yu, Tang Huan-Ling, and An Zhi-Yong. "Domain adaptation for pedestrian detection based on prediction consistency", Hindawi Publishing Corporation Scientific World Journal) (Year: 2014).*

(Continued)

*Primary Examiner* — Randolph I Chu
(74) *Attorney, Agent, or Firm* — Joseph Kolodka (57) ABSTRACT

A method is provided for unsupervised domain adaptation for video classification. The method learns a transformation for each target video clips taken from a set of target videos, responsive to original features extracted from the target video clips. The transformation corrects differences between a target domain corresponding to target video clips and a source domain corresponding to source video clips taken from a set of source videos. The method adapts the target to the source domain by applying the transformation to the original features extracted to obtain transformed features for the plurality of target video clips. The method converts the original and transformed features of same ones of the target video clips into a single classification feature for each of the target videos. The method classifies a new target video relative to the set of source videos using the single classification feature for each of the target videos.

18 Claims, 4 Drawing Sheets

(51) Int. Cl.
*G06T 7/33* (2017.01)
*G06K 9/03* (2006.01)

(52) U.S. Cl.
CPC .............. *G06K 9/03* (2013.01); *G06K 9/6276* (2013.01); *G06K 9/6289* (2013.01); *G06T 7/33* (2017.01); *G06T 2207/10016* (2013.01); *G06T 2207/20004* (2013.01); *G06T 2207/20081* (2013.01)

(58) Field of Classification Search
CPC .............. G06K 9/6232; G06K 9/6276; G06K 9/6289; G06T 2207/10016; G06T 2207/20004; G06T 2207/20081; G06T 7/33
See application file for complete search history.

(56) References Cited

OTHER PUBLICATIONS

Barekatain et al., "Okutama-Action: An Aerial View Video Dataset for Concurrent Human Action Detection", arXiv:1706.03038v2 [cs CV] Jun. 15, 2017, 8 pages.
Carreira et al., "Quo Vadis, Action Recognition? A New Model and the Kinetics Dataset", IEEE Conference on Computer Vision and Pattern Recognition (CVPR), Jul. 2017, pp. 6299-6308.
Ganin et al., "Unsupervised Domain Adaptation by Backpropagation", Proceedings of the 32nd International Conference on Machine Learning, Jul. 2015, 10 pages.
Jaderberg et al., "Spatial Transformer Networks", NIPS 2015, Dec. 2015, pp. 1-9.

\* cited by examiner

UNSUPERVISED DOMAIN ADAPTATION FOR VIDEO CLASSIFICATION

RELATED APPLICATION INFORMATION

This application claims priority to U.S. Provisional Patent Application Ser. No. 62/722,249, filed on Aug. 24, 2018, incorporated herein by reference herein its entirety.

BACKGROUND

Technical Field

The present invention relates to information processing and more particularly to unsupervised domain adaptation for video classification.

Description of the Related Art

It is desirable to perform domain adaptation in video classification. Often a sufficient amount of source videos have annotations while target domain videos lack such annotations. Further, such annotations are not readily obtained for the target domain. Hence, there is a need for unsupervised domain adaptation for video classification.

SUMMARY

According to an aspect of the present invention, a computer-implemented method is provided for unsupervised domain adaptation for video classification. The method includes learning, by a hardware processor, a respective transformation for each of a plurality of target video clips taken from a set of target videos, responsive to original features extracted from the plurality of target video clips. The respective transformation is for correcting differences between a target domain corresponding to the plurality of target video clips and a source domain corresponding to a plurality of source video clips taken from a set of source videos. The method further includes adapting, by the hardware processor, the target domain to the source domain by applying the respective transformation to the original features extracted from the plurality of target video clips to obtain transformed features for the plurality of target video clips. The method also includes converting, by the hardware processor, the original features and the transformed features of same ones of the plurality of target video clips into a single classification feature for each of the target videos in the set. The method additionally includes classifying, by the hardware processor, a new target video relative to the set of source videos using the single classification feature for each of the target videos in the set.

According to another aspect of the present invention, a computer program product is provided for unsupervised domain adaptation for video classification. The computer program product includes a non-transitory computer readable storage medium having program instructions embodied therewith. The program instructions are executable by a computer to cause the computer to perform a method. The method includes learning, by a hardware processor, a respective transformation for each of a plurality of target video clips taken from a set of target videos, responsive to original features extracted from the plurality of target video clips. The respective transformation is for correcting differences between a target domain corresponding to the plurality of target video clips and a source domain corresponding to a plurality of source video clips taken from a set of source videos. The method further includes adapting, by the hardware processor, the target domain to the source domain by applying the respective transformation to the original features extracted from the plurality of target video clips to obtain transformed features for the plurality of target video clips. The method also includes converting, by the hardware processor, the original features and the transformed features of same ones of the plurality of target video clips into a single classification feature for each of the target videos in the set. The method additionally includes classifying, by the hardware processor, a new target video relative to the set of source videos using the single classification feature for each of the target videos in the set.

According to yet another aspect of the present invention, a computer processing system is provided for unsupervised domain adaptation for video classification. The computer processing system includes a memory device including program code stored thereon. The computer processing system further includes a processor, operatively coupled to the memory device, and configured to run the program code stored on the memory device to learn a respective transformation for each of a plurality of target video clips taken from a set of target videos, responsive to original features extracted from the plurality of target video clips. The respective transformation is for correcting differences between a target domain corresponding to the plurality of target video clips and a source domain corresponding to a plurality of source video clips taken from a set of source videos. The processor further runs the program code to adapt the target domain to the source domain by applying the respective transformation to the original features extracted from the plurality of target video clips to obtain transformed features for the plurality of target video clips. The processor also runs the program code to convert the original features and the transformed features of same ones of the plurality of target video clips into a single classification feature for each of the target videos in the set. The processor additionally runs the program code to classify a new target video relative to the set of source videos using the single classification feature for each of the target videos in the set.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to unsupervised domain adaptation for video classification.

In an embodiment, a domain adaptation approach is provided for human action recognition in videos, which can take annotated videos of a source domain (e.g., third person videos), along with unannotated videos of a target domain (e.g., videos from drones, or a car mounted camera), and can learn a classifier for classifying the target domain videos. This is particularly suited to a scenario where a large amounts of source videos have annotation but the amount of annotations available on the target domain videos is significantly less (and is expensive to collect). In an embodiment, the present invention leverages the annotation on the source domain to learn a better classifier for the target domain.

In an embodiment, the proposed domain adaptation approach learns transformations to align the videos from challenging platforms (e.g., taken from drones) to those taken from standard third person cameras. This alignment is learned by minimizing a loss which is a combination of two components: (i) domain adversarial loss which ensures alignment of the two domains at either the video level or at an intermediate feature level, and (ii) classification or verification loss which forces correct classification for the source domain examples. Upon learning the parameters of the feature extractor, the transformation module, and the classifier, at inference when a new target domain video is presented to the system, the system first aligns the video and then classifies the video to either (i) one of the source classes, if the source and target classes are the same, or (ii) gives an embedding which can be used to do nearest neighbor based classification in the target domain.

Figure 1:
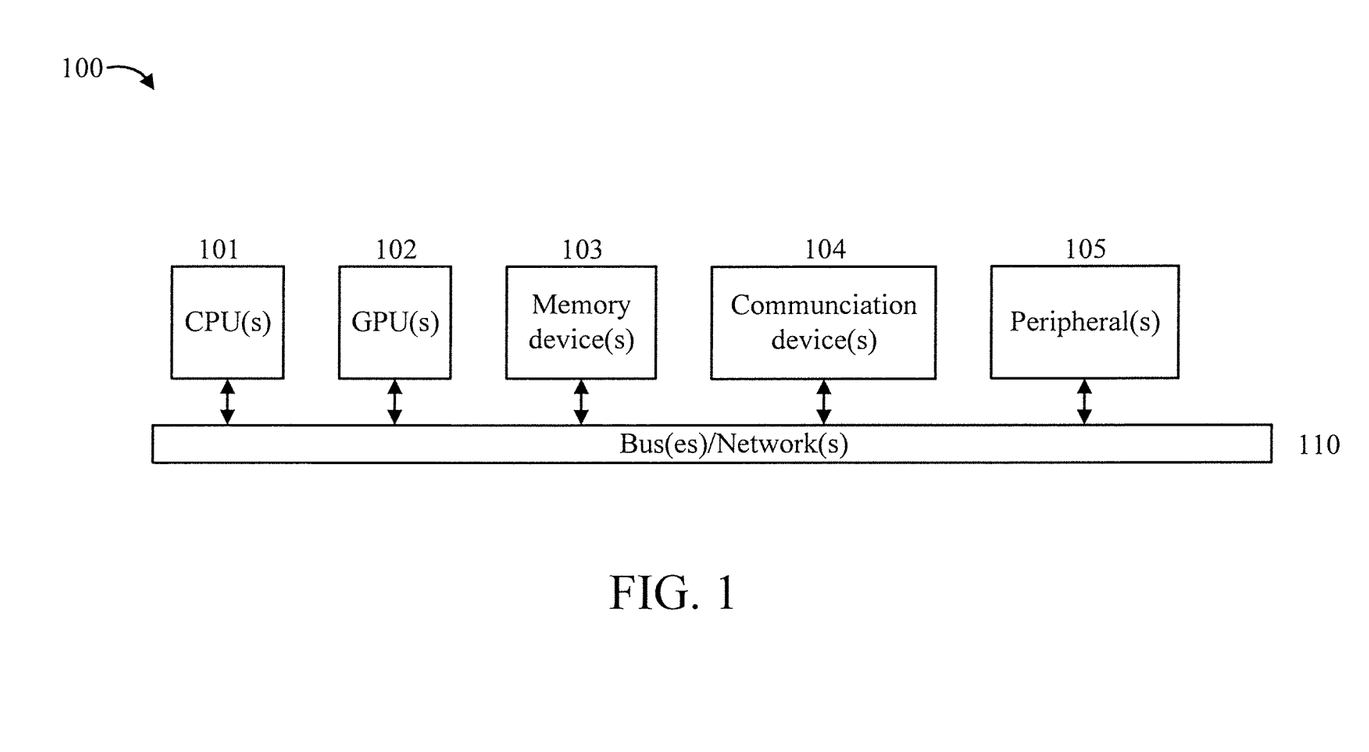
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

In an embodiment, the one or more memory devices 103 include an entailment module 103A. In another embodiment, the entailment module 103A can be implemented as special purpose hardware (e.g., an Application Specific Integrated Circuit, and so forth).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
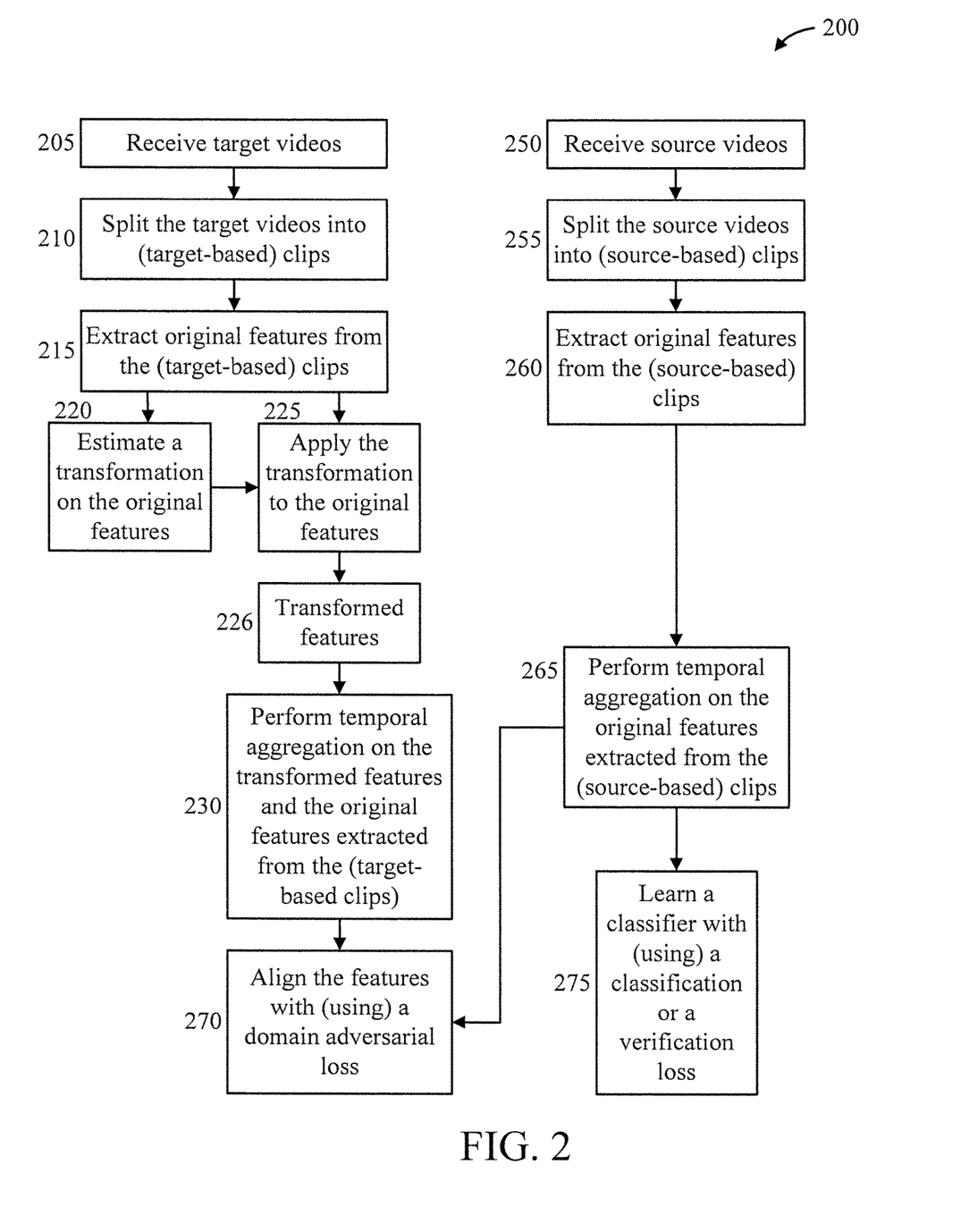
FIG. 2 is a high-level block/flow diagram showing an exemplary training method for unsupervised domain adaptation for video classification, in accordance with an embodiment of the present invention.

FIG. 2 is a high-level block/flow diagram showing an exemplary training method 200 for unsupervised domain adaptation for video classification, in accordance with an embodiment of the present invention.

At block 205, receive target videos.

At block 210, split the target videos into (target-based) clips.

At block 215, extract original features from the (target-based) clips.

At block 220, estimate a transformation on the original features.

At block 225, apply a/the transformation to the original features to obtain transformed features 226. In an embodiment, one or more estimated transformation (per block 220) and/or one or more predetermined transformations can be performed (the latter bypassing the estimating per block 220 in at least one application of the transformation).

At block 230, perform temporal aggregation on the transformed features and the original features extracted from the (target-based clips). The output of the temporal aggregation is a respective single feature for each of the target videos.

At block 250, receive source videos.

At block 255, split the source videos into (source-based) clips.

At block 260, extract features from the (source-based) clips.

At block 265, perform temporal aggregation on the original features extracted from the (source-based) clips. The output of the temporal aggregation is a respective single feature for each of the source videos.

At block 270, align the (single) features with (using) a domain adversarial loss.

At block 275, learn a classifier with (using) a classification or a verification loss.

Figure 3:
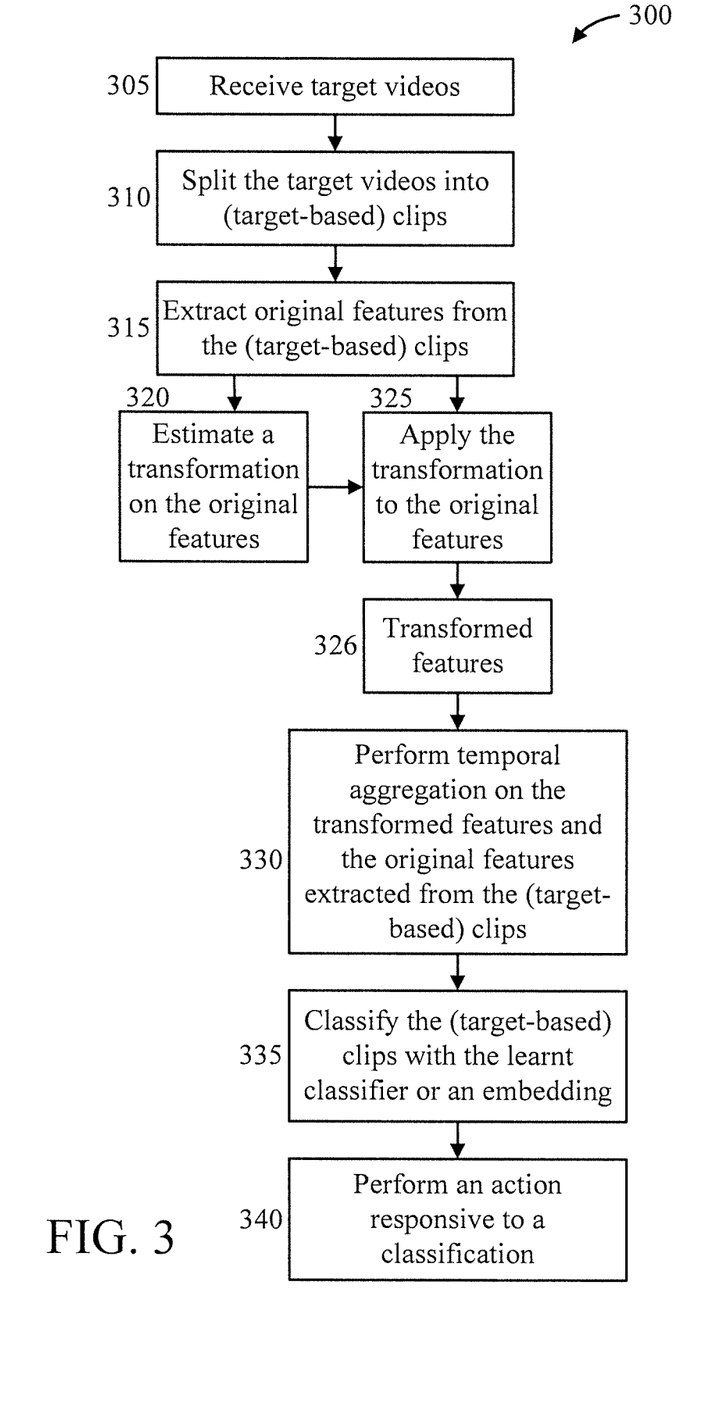
FIG. 3 is a high-level block/flow diagram showing an exemplary testing (inference) method for unsupervised domain adaptation for video classification, in accordance with an embodiment of the present invention.

FIG. 3 is a high-level block/flow diagram showing an exemplary testing (inference) method 300 for unsupervised domain adaptation for video classification, in accordance with an embodiment of the present invention.

At block 305, receive target videos.

At block 310, split the target videos into (target-based) clips.

At block 315, extract original features from the (target-based) clips.

At block 320, estimate a transformation on the original features.

At block 325, apply a/the transformation to the original features to obtain transformed features 326. In an embodiment, one or more estimated transformation (per block 320) and/or one or more predetermined transformations can be performed (the latter bypassing the estimating per block 320 in at least one application of the transformation).

At block 330, perform temporal aggregation on the transformed features. The output of the temporal aggregation is a respective single feature for each of the target videos.

At block 335, classify the (target-based) clips using the trained classifier (trained per method 200) or an embedding.

At block 340, perform an action responsive to a classification obtained from block 335. The action can involve, for example, controlling a machine (to shut down, to power up, to turn on lights or open locked doors), to take an avoidance maneuver by a vehicle (e.g., in an Advanced Driver Assistance System (ADAS)), and so forth), to switch to another power source (e.g., batteries) in, e.g., a power management system predicting a power outage, etc.

Figure 4:
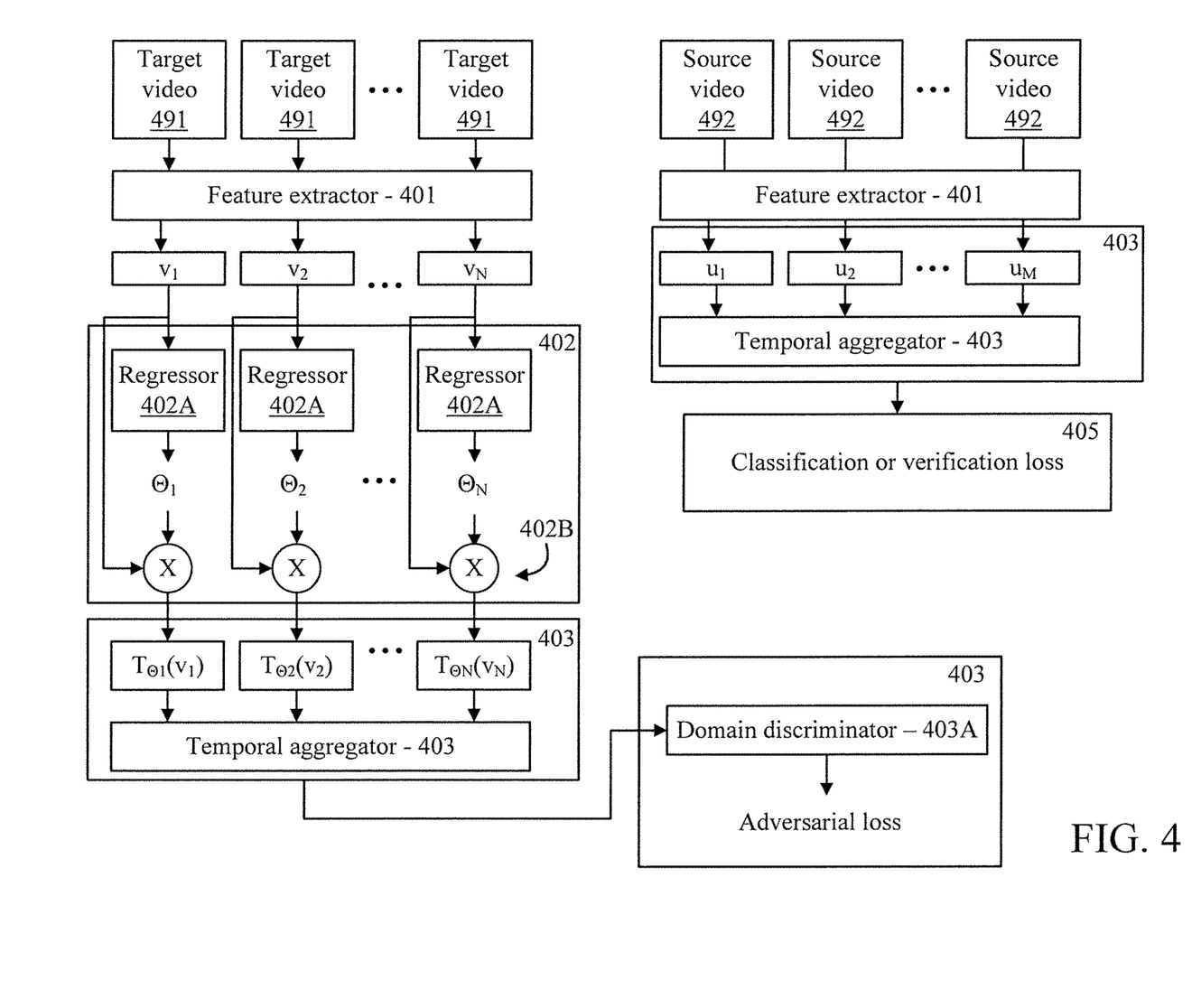
FIG. 4 is a block diagram showing an exemplary system for unsupervised domain adaptation for video classification, in accordance with an embodiment of the present invention.

FIG. 4 is a block diagram showing an exemplary system 400 for unsupervised domain adaptation for video classification, in accordance with an embodiment of the present invention. One or more elements of system 400 can be implemented by one or more elements of system 100.

In FIG. 4, $u_1, u_2 \ldots u_M$ are the feature vectors for the M clips (with some overlap if required) of the target video 491. Similarly, $v_1, v_2, \ldots v_N$ are the feature vectors of the N clips (the number of clips in source and target video can be different) of the source video. $\Theta_1, \Theta_2, \ldots \Theta_N$ are the parameters of the transformation function T, which acts on the clip features $v_1, v_2, \ldots v_N$ of the target video and gives the transformed features $T_{\Theta 1}(v_1), T_{\Theta 2}(v_2), \ldots T_{\Theta N}(v_N)$.

Inputs to the system 400 include target videos 491 (e.g., taken by a drone) and source videos 492 (e.g., taken by a third person).

The system 400 includes a feature extractor 401, a transformation predictor (regressor) 402, a temporal aggregator 403, a domain adversarial loss calculator 404, and a classification and/or verification loss calculator 405.

The feature extractor 401 is a convolutional neural network (CNN) which takes short clips of the input video and extracts features of the video. This can be any image or video based CNN. For the target video, the extracted features can be output in the form of feature vectors $v_1$ through $v_N$. For the source video, the extracted features can be output in the form of feature vectors $u_1$ through $u_m$.

The transformation predictor (regressor) 402 is itself a neural network (or can be a Support Vector Regressor (SVR)) which takes the features extracted from the input clips, and predicts a potentially unique transformation for each of the clips. Since the whole system is learnt, the intuition is that the transformation predictor 402 learns to "correct" the viewpoint and motion differences between the standard third person videos and the current target videos taken from a more challenging platform. In further detail, the transformation predictor 402 predicts the transformation parameters, e.g., if it is a general projective transformation then the parameter matrix is 3×3 with 8 degrees of freedom (DOF). The transformation type is decided by the system designer and can be any of the following: Isometric (3 DOF), similarity (4 DOF), affine (6 DOF) or projective (8 DOF) transformation. Once the transformation is predicted, it is applied to the clip features to output new transformed features which go further in the pipeline. The transformation predictor 402 includes a set of regressors 402A and a set of multipliers 402B used to output the new transformed features. In further detail, the set of regressors 402A take the clip as input and predict the parameters of the transformation to be applied to that particular clip. The parameter matrix is 3×3 with the degrees of freedom depending on the type of parameter decided by the system designer. Once calculated this transformation is applied on the extracted features to obtain the transformed features.

The temporal aggregator 403 takes the features (the transformed features for the target, and the original features for the source) of the clips of each video and converts them into one single feature for the whole video. This is a many to one operation, i.e., different videos might have different lengths and hence give different number of clips. The temporal aggregator 403 takes all the clips from a video outputs a single feature. In an embodiment, the temporal aggregator 403 can apply a dimension-wise max, or an average operation.

The domain adversarial loss calculator 404 predicts which video feature comes from the source domain and which comes from the target domain. The learning is based on maximizing the domain adversarial loss by a feature portion of the calculator 404 and minimizing the domain adversarial loss by a domain adversarial portion of the calculator 404. This results in features which are hard to distinguish in terms of their originating domain and hence are aligned with each other (in terms of domain). This would make using the features for the target domain with the source domain classifier as they would then be aligned. The domain adversarial loss calculator 404 includes a domain discriminator 404A for predicting which video features comes from the source domain and which comes from the target domain.

The classification or verification loss calculator 405 ensures that the source features are learned in a way which is discriminative with respect to the source classification task. The classification loss is used when the source and target labels are the same, while the verification loss is used when they are different. In the former case (source and target labels are the same), once the system is learnt, the source classifier can be directly used for the target examples. In the latter (source and target labels differ), the feature embedding can be used for the target domain to do nearest neighbor based classification.

Further, the transformation predictor (regressor) 402, with learning and applying a transformation for video clips to align videos of two domains, by itself is a general regressor (e.g., it can be a Support Vector Regressor (SVR) or a Neural Network), which predicts the parameters of the transformation function. These parameters are predicted separately for each clip of the video and can be different for each clip of video if required. The motivation for learning such transformation is that the system would learn to appropriately correct the factors of variations which make the videos from two domains different, e.g., in case of drone videos it would possibly learn to correct the perspective so that the drone videos are transformed to be similar to third person videos, similarly the correction could be based on the motion in the videos and it can be based on some subtle yet important variation which is not easily detectable by humans.

A description will now be given regarding one or more advantages of the present invention, in accordance with one or more embodiments of the present invention.

Domain adaptation for human action recognition results in better performances on the task, especially when not much annotated data is present for the target domain. The present invention leverages the annotated data from the source domain (which is usually third person videos for which large amounts of annotated data is now available publicly) and leads to improved performances on the target domain task. These and other advantages are readily determined by one of ordinary skill in the art given the teachings of the present invention provided herein.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for unsupervised domain adaptation for video classification, comprising:
    learning, by a hardware processor, a respective transformation for each of a plurality of target video clips taken from a set of target videos, responsive to original features extracted from the plurality of target video clips, the respective transformation for correcting differences between a target domain corresponding to the plurality of target video clips and a source domain corresponding to a plurality of source video clips taken from a set of source videos;
    adapting, by the hardware processor, the target domain to the source domain by applying the respective transformation to the original features extracted from the plurality of target video clips to obtain transformed features for the plurality of target video clips;
    converting, by the hardware processor, the original features and the transformed features of same ones of the plurality of target video clips into a single classification feature for each of the target videos in the set; and
    classifying, by the hardware processor, a new target video relative to the set of source videos using the single classification feature for each of the target videos in the set,
    wherein said learning step learns the respective transformation that corrects for motion differences between the source domain and the target domain.

2. The computer-implemented method of claim 1, further comprising extracting the original features using a convolutional neural network.

3. The computer-implemented method of claim 1, wherein said learning step learns the respective transformation that corrects for viewpoint differences between the source domain and the target domain.

4. The computer-implemented method of claim 1, further comprising performing source to target video alignment for said classifying step based on a domain adversarial loss which predicts which of the features are from the source domain and which of the features are from the target domain.

5. The computer-implemented method of claim 1, wherein said converting step is performed on the original features and the transformed features using a dimension-wise maximum function.

6. The computer-implemented method of claim 1, wherein said converting step is performed the original features and the transformed features using an averaging function.

7. The computer-implemented method of claim 1, wherein said classifying step selectively uses a classification loss or a verification loss responsive to source and target labels being identical or different, respectively.

8. The computer-implemented method of claim 1, further comprising using a classification loss in said classifying step responsive to source and target labels being identical, the source and target labels corresponding to a particular one of the plurality of source video clips and a particular one of the plurality of target video clips, respectively.

9. The computer-implemented method of claim 1, further comprising using a verification loss in said classifying step responsive to source and target labels being different, the source and target labels corresponding to a particular one of the plurality of source video clips and a particular one of the plurality of target video clips, respectively.

10. The computer-implemented method of claim 1, wherein said classifying step comprising using a feature embedding for the new target video relative to the target domain for a near-neighbor based classification.

11. The computer-implemented method of claim 1, wherein the hardware processor uses a Support Vector Regressor to predict parameters of the respective transformation.

12. The computer-implemented method of claim 1, further comprising capturing, by a drone, the target videos in the set.

13. A computer program product for unsupervised domain adaptation for video classification, the computer program product comprising a non-transitory computer readable storage medium having program instructions embodied therewith, the program instructions executable by a computer to cause the computer to perform a method comprising:
    learning, by a hardware processor, a respective transformation for each of a plurality of target video clips taken from a set of target videos, responsive to original features extracted from the plurality of target video clips, the respective transformation for correcting differences between a target domain corresponding to the plurality of target video clips and a source domain corresponding to a plurality of source video clips taken from a set of source videos;
    adapting, by the hardware processor, the target domain to the source domain by applying the respective transformation to the original features extracted from the plurality of target video clips to obtain transformed features for the plurality of target video clips;
    converting, by the hardware processor, the original features and the transformed features of same ones of the plurality of target video clips into a single classification feature for each of the target videos in the set; and
    classifying, by the hardware processor, a new target video relative to the set of source videos using the single classification feature for each of the target videos in the set, wherein said learning step learns the respective transformation that corrects for motion differences between the source domain and the target domain.

14. The computer-implemented method of claim 13, wherein said learning step learns the respective transformation that corrects for viewpoint differences between the source domain and the target domain.

15. The computer-implemented method of claim 13, wherein the method further comprises performing source to target video alignment for said classifying step based on a domain adversarial loss which predicts which of the features are from the source domain and which of the features are from the target domain.

16. The computer-implemented method of claim 13, wherein said converting step is performed on the original features and the transformed features using a dimension-wise maximum function.

17. The computer-implemented method of claim 13, wherein said converting step is performed the original features and the transformed features using an averaging function.

18. A computer processing system for unsupervised domain adaptation for video classification, comprising:
- a memory device including program code stored thereon; and
- a processor, operatively coupled to the memory device, and configured to run the program code stored on the memory device to learn a respective transformation for each of a plurality of target video clips taken from a set of target videos, responsive to original features extracted from the plurality of target video clips, the respective transformation for correcting differences between a target domain corresponding to the plurality of target video clips and a source domain corresponding to a plurality of source video clips taken from a set of source videos;

adapt the target domain to the source domain by applying the respective transformation to the original features extracted from the plurality of target video clips to obtain transformed features for the plurality of target video clips;

convert the original features and the transformed features of same ones of the plurality of target video clips into a single classification feature for each of the target videos in the set; and classify a new target video relative to the set of source videos using the single classification feature for each of the target videos in the set, wherein said learning step learns the respective transformation that corrects for motion differences between the source domain and the target domain.

* * * * *